UNITED STATES PATENT OFFICE.

CHARLES G. ARMSTRONG, OF NEW YORK, N. Y.

METHOD AND APPARATUS FOR GARBAGE DISPOSAL.

1,415,290.  Specification of Letters Patent.  Patented May 9, 1922.

Application filed February 24, 1917. Serial No. 150,859.

*To all whom it may concern:*

Be it known that I, CHARLES G. ARMSTRONG, in the city of New York, county and State of New York, have invented certain new and useful Improvements in Methods and Apparatus for Garbage Disposal.

In cities and towns situated upon waterways it is the practice, in disposing of garbage, particularly when the ingredients are to be recovered for utilization, to collect the same in carts, from which it is dumped into scows moored at certain docks, and then to tow the scows so loaded to a reduction plant. The operations at the reduction plant varies according to the uses intended to be made of the materials recovered. It is usual, however, to separate the greases and oils from the garbage and also all organic matter that can serve as animal food and fertilizers; and, to do this the garbage is placed in large cooking plants or digesters, a solvent, such as kerosene is added, to dissolve the greases and oils therein, and the garbage is then thoroughly cooked by the introduction of steam into jackets of the cooking tanks. After cooking, the contents of the tanks are separated mechanically.

This system has several objections, amongst which may be mentioned the unsanitary conditions connected with the loading of open scows at the city docks, and during transportation to the reduction plant, including the offensive odors emitted from the garbage during all of this time. The reduction plant itself has also been objected to by the inhabitants nearby on account of the effluent waters discharged therefrom.

The objects of my invention are, to improve on these methods, to render it unnecessary to leave garbage in the open untreated for any considerable time, to eliminate the transportation of untreated garbage, and, generally, to reduce the offensiveness of the operations to a minimum. With these objects in view, I provide a number of garbage receiving depots at suitable points in the city, each of which is provided with a bin, into which the garbage may be delivered by the collecting carts and at once sprinkled with kerosene or the like, which will not only kill the odors, but, in the subsequent cooking of the garbage, serve to dissolve and separate the oils and greases therefrom. The bins of the receiving depots are, preferably, situated convenient to a waterway, and so arranged that their contents may be discharged by gravity into the cooking tanks or digesters of a garbage reduction plant carried by a boat. This garbage reduction plant comprises, not only the cooking tanks, but apparatus for mechanically separating the constituents of the garbage. The invention is not limited however, to the operations of a boat, but may be applied to other vehicles and the storage bins may be located elsewhere than along a waterway.

The garbage in such bins, having been saturated with kerosene, or its equivalent, is transferred to one or more of the cookers of the reduction plant, the operation of which is well known to those skilled in the art. The heavy greases separated from the garbage during the cooking process, remaining in the cooking tank are dissolved in hot oil and drained off to a proper receptacle, which receptacle is a still. The solvent is then boiled off in this still and the heavy greases are recovered and ready for market. The solvent that is boiled off is condensed and again collected in the storage tanks and may be again used at the receiving bins.

What I claim is:

1. The process of collecting and disposing of garbage consisting in establishing one or more receiving bins for the garbage, saturating the garbage in the depots with a hydrocarbon to deodorize the same and to act as a solvent in the subsequent treatment thereof, then transferring the garbage from the depots to a reduction plant, then adding to the garbage any additional hydrocarbon required and applying heat to the same, separating therefrom the oils, greases and water contained therein.

2. The process of collecting and disposing of garbage consisting in establishing one or more receiving bins for the garbage, saturating the garbage in the depots with a hydrocarbon to deodorize the same and to act as a solvent both in the first and in the subsequent treatment thereof, then transferring the garbage from the depots to a reduction plant, then adding to the garbage any additional hydrocarbon required and applying heat to the same, separating therefrom the oils, greases and water contained therein.

CHARLES G. ARMSTRONG.